United States Patent
Pierce (10) Patent No.: US 7,040,015 B2
(45) Date of Patent: May 9, 2006

(54) TUBE FINNING MACHINE AND METHOD OF USE

(76) Inventor: David Bland Pierce, 24 Dorsington Close, Hatton Park, Warwick (GB) CV35 7TH ( * ) Notice: Subject to any disclaimer, the term of this patent is extended or adjusted under 35 U.S.C. 154(b) by 359 days.

(21) Appl. No.: 10/398,786

(22) PCT Filed: Oct. 8, 2001

(86) PCT No.: PCT/IB01/01859

§ 371 (c)(1),
(2), (4) Date: Apr. 7, 2003

(87) PCT Pub. No.: WO02/30591

PCT Pub. Date: Apr. 18, 2002

(65) Prior Publication Data

US 2004/0025345 A1    Feb. 12, 2004

(30) Foreign Application Priority Data

Oct. 7, 2000    (GB) ................................ 0024625.6

(51) Int. Cl.
*B23P 15/26* (2006.01)
(52) U.S. Cl. .................. 29/890.047; 29/890.038; 29/726; 29/726.5
(58) Field of Classification Search .................. 29/726, 29/726.5, 727, 890.04, 890.047, 890.038; 165/151
See application file for complete search history.

(56) References Cited

U.S. PATENT DOCUMENTS

| | | | |
|---|---|---|---|
| 1,481,169 A * | 1/1924 | Witte .......................... | 29/726 |
| 1,588,174 A * | 6/1926 | Dewald ................. | 29/890.046 |
| 2,057,244 A | 10/1936 | Maynes | |
| 2,410,140 A * | 10/1946 | Young .......................... | 29/726 |
| 2,481,490 A * | 9/1949 | Bennett et al. ................ | 29/727 |
| 2,688,178 A * | 9/1954 | Boyd et al. .................. | 29/33 G |
| 3,733,673 A | 5/1973 | Young et al. | |
| 3,889,745 A * | 6/1975 | Siemonsen ................... | 165/151 |
| 3,982,311 A | 9/1976 | Rasmussen | |
| 4,601,088 A | 7/1986 | Kopczynski | |
| 4,637,132 A * | 1/1987 | Iwase et al. ................... | 29/726 |
| 5,014,422 A * | 5/1991 | Wallis .................... | 29/890.044 |
| 5,029,382 A * | 7/1991 | Breda et al. ................... | 29/726 |
| 5,206,990 A * | 5/1993 | Wright .................... | 29/890.047 |
| 5,752,312 A * | 5/1998 | Harman et al. ............. | 29/726.5 |

(Continued)

FOREIGN PATENT DOCUMENTS

FR    894711    1/1945

(Continued)

Primary Examiner—Eric Compton
(74) Attorney, Agent, or Firm—Steven J. Hultquist; Intellectual Property/Technology Law (57) ABSTRACT

This invention relates to a tube finning machine (10), and in particular to a machine capable of fitting several fins (26) to one or more tubes (26) at the same time, the assembled finned tube being suitable for heat exchange applications. According to one aspect of the invention there is provided a tube finning machine for mounting extended surface members (96) upon one or more tubes, the machine having a base (10), carrier means movable relative to the base, drive means (20) for moving the carrier means (18) in a longitudinal direction, and cartridge means (24) for locating a plurality of extended surface members (26), the cartridge means having respective support means (30) for each extended surface member, and at least some of the support means being movable relative to the cartridge. There is also provided a method of using a machine as herein defined for finning a tube.

16 Claims, 5 Drawing Sheets

U.S. PATENT DOCUMENTS 5,966,809 A * 10/1999 Pierce .................. 29/890.047

FOREIGN PATENT DOCUMENTS

| GB | 1 382 263 | 1/1975 |
| JP | 61-269944 | * 11/1986 |
| JP | 04253486 | 3/1994 |
| JP | 2001-062651 | * 3/2001 |
| WO | WO 96/35093 | 11/1996 |

* cited by examiner

TUBE FINNING MACHINE AND METHOD OF USE

CROSS-REFERENCE TO RELATED APPLICATIONS

This application claims priority under 35 USC 371 to International Patent Application No. PCT/IB01/01859 filed on Oct., 8, 2001, which in turn claims priority to Great Britain Patent Application No. 0024625.6 filed on Oct. 7, 2000.

FIELD OF THE INVENTION

This invention relates to a tube finning machine and method of use, and in particular to a machine capable of fitting several extended surface members (or fins) to one or more tubes at the same time, the assembled finned tube being suitable for heat exchange applications. In one aspect, the present invention is an improvement to a machine such as that disclosed in patent application WO96/35093.

BACKGROUND TO THE INVENTION

Often it is necessary to cool a working fluid, and it is known for this purpose to use a heat exchanger. Heat exchangers often comprise one or more metallic tubes suspended between two tube plates. The working fluid to be cooled, which may for example be water or oil, flows through the tubes, whilst the coolant passes around and between those tubes, the working fluid giving up its latent heat to the tubes and thus to the coolant.

The effective surface area of a tube can be enlarged in order to increase the heat transfer, as by the addition of one or more annular extended surface members or fins in thermal contact with the outer surface of the tube. Such finned tubes are particularly useful if the coolant has a low viscosity, and if the coolant is a gas, such as air.

If the tubes are to withstand the internal pressure of the fluid to be cooled, the addition of the fins should not reduce or significantly reduce the tube bursting strength. If the fins are to increase the heat transfer they should not significantly inhibit the flow of coolant, and preferably should encourage turbulent coolant flow.

The tubes to be used for heat exchangers should meet certain standards (in the UK for instance British Standard 2871 Part 3), these standards being relevant also for those tubes which are formed by extrusion to provide selected internal formations chosen to enhance internal turbulent flow i.e. to avoid laminar or stratified flow of the working fluid to be cooled; desirably the tube finning should not reduce those respective standards e.g. of tube wall thickness and thus of strength, or of tube uniformity and fin engagement and thus of heat transfer to the fins.

The fins should be positioned on the tube so as to encourage maximum heat transfer to the coolant, which will not occur if the fin spacing is irregular, or if the fin angles are irregular (with an annular gap of varying axial length between adjacent fins).

If the tube walls need to be thinned to accept the fins, one or more of the tubes may burst in service and need to be plugged; if the fins are irregularly spaced and/or angled the performance of the heat exchanger will be reduced.

It is a known design criterion when constructing a matrix or array of finned tubes for a heat exchanger both to arrange the tubes as close to each other as possible (to reduce the size of the heat exchanger), and to have a maximum area available for thermal transfer between the working fluid and the coolant (to maximise the possible heat exchange). When utilising tubes fitted with the known annular fins in such an array, the spacing between the tubes will be limited by the outer diameter of the fin(s); if as is usual the fins have circular outer peripheries there are areas between adjacent tubes which do not contribute to heat transfer, and a finning method and machine permitting fins to be fitted which can utilise these areas is desirable.

The performance of a heat exchanger in part depends upon the number of fins fitted to a tube, and to the total number of fins i.e. to the aggregate extended area available for heat exchange, as well as to the positioning and disposition of those fins.

When seeking to overcome the disadvantage of the unused heat-exchange area caused by the use of fins with a circular periphery, it is known to replace the separate fins of adjacent tubes by axially-spaced "common-fins" i.e. fins which engage (and interconnect) several tubes. Typically, a common-fin takes the form of an extended plate having several apertures, each aperture being adapted to receive a respective tube, the plate-like common-fin being in simultaneous thermal contact with several tubes, and being adapted to transfer the heat from all of the tubes across the full area therebetween. An array of tubes to which are mounted a plurality of multi-apertured common-fins is referred to herein as a "fin block", though in other documents it is also referred to as a "coil block" or "block fin".

It will be understood that in a fin block, each fin can be continuous between and around each tube in the block, so that a minimum of heat transfer area is wasted. It will be further understood that the tubes in each block are fixed relative to the other tubes of that block by the prefitted plate-like common-fins.

A known further advantage of such assembled fin block is its relative ease of fitment into a heat exchanger. Thus, for a heat exchanger requiring two hundred separate finned tubes for instance, each of the two hundred tubes must be fitted to both tube plates, and perhaps also to separate support plates as may be required for longer tubes. However, if a fin block is prepared having twenty tubes, then only ten such blocks are required to be handled and fitted.

In a known method of manufacturing a fin block, a stack of common-fins is arranged, adjacent fins being axially spaced by a distance to suit the requirements of a particular heat exchanger; each common-fin has several apertures, the apertures corresponding in pattern to the required tube arrangement. The apertures are slightly larger than the outside diameter of the tubes, and the common-fins are held with their respective apertures aligned. The tubes are then individually passed through the apertures, and when in position a "bullet" is pulled through each tube, to expand the tube wall into mechanical contact with the respective fin apertures. A method of this general type is disclosed in U.S. Pat. No. 3,889,745.

This method is not suitable for extruded tubes having internal formations (e.g. for promoting turbulent flow of the liquid to be cooled), since a bullet cannot be passed through such tubes.

Another disadvantage of this known bulleting method is that the wall thickness of the tubes is limited by the need for the wall to be stretched by the bulleting operation, so that thinner-walled tubes have to be used than might otherwise be desired; for example, in practice for a stainless steel tube with an outer diameter of 0.75" (19.05 mm) it is rare for tube thicker that 22 Gauge ("Standard Wire Gauge") to be bulleted. A further disadvantage is that the bulleting operation introduces stress into the tubes, and can change the grain structure; the stress is typically not removed by heat treatment since the heat treatment would act also to soften the fins and reduce the thermal contact between the fins and tubes, i.e. the stress induced by the bulleting operation typically remains in the tube and thus in the heat exchanger as an unwanted side effect of this method of production. Yet another disadvantage is that the material specification of the tubes can be altered by the bulleting operation; for example, if the heat exchanger user specified that annealed tubes should be used, the bulleting operation can in some circumstances alter the annealed material into a non-annealed hardened state. Another further disadvantage is that the tube must be of deformable material, so limiting the material which can be used.

Bulleting can also result in non-parallel finning. As the bullet is pulled through the tube, the tube wall can form an angled "front" which moves down the tube immediately ahead of the bullet, as a "ripple"; adjacent fins subject to the "ripple" are likely either to be moved along the tube, or to adopt different angles relative to the tube, resulting on occasion with parts of adjacent fins touching and with other parts spaced by a greater distance than intended. The expansion caused by the bullet is such that once the bullet has passed a fin, the position of the fin cannot subsequently be corrected or altered.

Usually when "rippling" is seen to be occurring during tube finning the bullet has nevertheless to be fully drawn through the tube so that it can be reused, even though the manufacturer recognises that the resulting finned tube is likely to be rejected as unsuitable for heat exchanger use. Also, if a set of tubes is finned whilst in position in a heat exchanger array, any fin displacement which occurs upon internal and thus non-visible tubes cannot be observed, so that the resulting loss of heat exchanger performance might not be realised until the exchanger is in service.

U.S. Pat. No. 3,733,673 discloses a machine for fitting several fins to one or two tubes at the same time. The fins are arranged in a cartridge, and held along their top and bottom edges. Each fin has a number of apertures therein which are sized and shaped to correspond closely with the outer periphery of the tubes to be fitted thereinto. The machine is pneumatically actuated and can drive one or two tubes at a time though the aligned apertures in the fins. Following insertion of the fin or fins, the machine can subsequently be used to insert one or two further tubes into respective apertures of the fins, until all of the tubes have been inserted thereinto.

It is a disadvantage of this machine that the cartridge provides only limited support for the fins, and so the fins need to be sufficiently rigid to remain undeformed by the insertion of the tubes. On the other hand, it is desirable that there be sufficient engagement between the tubes and the fins to ensure good heat transfer therebetween, and it is also desirable that the fins be as thin as possible to reduce the weight of the assembled fin block and also to maximise heat transfer. A compromise is therefore necessary between reducing the thickness of the fins so as to maximise heat exchange, and increasing the thickness of the fins so as to ensure that the fins do not become deformed as the tubes are forced therethrough. A further compromise is necessary between arranging the fins to be a tight fit upon the tubes (so as to maximise the heat transfer therebetween), and arranging the fins to be a loose fit upon the tubes so that the tubes can be moved more easily therethrough with a reduced likelihood of deformation of the fins.

It is another disadvantage of this machine that only two tubes can be inserted into the fins at a time, so that considerable time is taken to produce a large fin block. The provision of a maximum of two tubes is due to some extent to the maximum power of the machine, but greater relevance is understood to be given to the practical disadvantage that as more tubes are inserted at the same time, the greater is the likelihood of deforming some of the fins.

A machine for making fin block (though it could also apply individual fins to individual tubes) is disclosed in WO96/35093. That machine utilises a linear motor to drive a fin (or common-fin) onto one or more tubes. In an alternative method of using the machine, a first fin can be driven onto the end of the tubes, and a second fin driven into engagement therewith, both fins subsequently being driven along the tubes to their predetermined positions. It is accepted that the collars of the two fins will interlock in such circumstances, and it is necessary that the machine have sufficient power to drive such interlocked fins.

SUMMARY OF THE INVENTION

The present invention seeks to improve upon the prior art machines described above, and seeks to reduce or avoid the disadvantages associated therewith.

According to a first aspect of the invention there is provided a tube finning machine for mounting extended surface members or fins upon one or more tubes, the machine having a base, carrier means movable relative to the base, drive means for moving the carrier means in a longitudinal direction, and cartridge means for locating a plurality of extended surface members, the cartridge means having respective support means for each extended surface member, and at least some of the support means being movable relative to the cartridge.

The machine according to the third aspect differs from that of U.S. Pat. No. 3,733,673 in that the fins are able to "nest" together upon the tube. Thus, it is known for the fins to have collars surrounding the tube-receiving apertures, one purpose of the collars being to increase the area of contact between the tube and the fin. However, in many applications it is desired that the fins are sufficiently closely spaced for the collar of one fin to engage the collar of the adjacent fin. If the fins are pressed together the collars can interlock, serving to further secure the fins in position upon the tube. However, when the fins are to be moved relative to the tube(s) during the finning procedure, it is not desired that the collars interlock since this increases the frictional resistance to movement, and so the fins are deliberately spaced apart by the cartridge. With a machine according to the first aspect each fin can be moved to a predetermined position upon the tube(s), whether or not the fins have collars, and whether or not those collars are desired to interlock.

According to a second aspect of the invention there is provided a tube finning machine for mounting extended surface members upon one or more tubes, the machine having a base, carrier means movable relative to the base, drive means for moving the carrier means, and cartridge means for locating a plurality of extended surface members, the cartridge means having a respective support means for each extended surface member, each support means spanning a substantial part of the extended surface member.

The machine according to the second aspect differs from that of U.S. Pat. No. 3,733,673 in that a greater area of the fins are supported by the cartridge means, reducing the likelihood of the fins becoming damaged or distorted during tube finning. Alternatively stated, the fins may be made thinner, and their engagement with the tube(s) increased, so as to enhance the heat transfer, with less risk of distortion.

According to a third aspect of the invention there is provided a tube finning machine for the manufacture of a heat exchange fin block, which machine includes a base, carrier means movable relative to the base, drive means for moving the carrier means, and cartridge means for locating a number of fins, a clamping means mounted to the base for clamping a portion of at least one tube in a substantially fixed position relative to the base, the cartridge means being connected to the carrier means so that the number of fins can be moved to an axially predetermined position relative to the tube(s).

The machine according to the third aspect differs from that of U.S. Pat. No. 3,733,673 in that the fins are moved relative to the substantially stationary tube(s). This has a significant advantage when the machine is used to assemble larger fin blocks. Thus, it will be understood that whilst a number of fins can be driven along the tube(s) by the present machine (and one or two tubes can be driven through a number of fins by the prior art machine), the power of the machine determines the maximum number of fins which can be used at any one time, i.e. the machine must be able to exceed the combined frictional resistance of the fins and tube(s). If a fin block has two tubes and one thousand common-fins, for example, it is not likely to be practical to build a machine having sufficient power to fit all of those fins at one time, and instead it would be practical to fit a smaller number of common-fins (or a "set" of common-fins) at one time, for example twenty common fins, and successively to fit fifty such sets. With a machine in which the tubes move, there would need to be a means of supporting the previously-fitted fins as they are moved with the tubes, and the means to move the tubes would need to be robust enough to withstand and move the weight of the tubes plus an increasing number of fins. With a machine according to the present invention, however, the tubes and the previously-fitted fins are stationary, and can more readily be supported; the movable carrier means need only support and move a cartridge of known and consistent weight. Clearly also, the likelihood of damage to the previously-fitted fins is much reduced if they remain stationary during the remainder of the finning procedure, or alternatively stated less precautions need to be taken to prevent damage to the stationary fins.

The disadvantage of the prior art machine is more manifest if the number of tubes in the assembled fin block is greater than two, since in such circumstances it is not feasible to assemble "sets" of fins as above described to two tubes and subsequently to another two tubes. The heat exchanger assembler would have to construct such a fin block as separate smaller fin blocks, so avoiding the advantage of a single larger fin block.

Preferably, the periphery of the fins lies within the periphery of the support means, so that the support means can provide support to substantially the whole of the fin. However, in such embodiments it is necessary that the support means be apertured to allow the tube(s) to pass therethrough; it is desirable that the support means do not engage the tube(s) whereas it is desirable that the fins do engage the tube(s).

Preferably, at least some of the support means are longitudinally movable relative to the cartridge means. Such an arrangement allows the support means to adopt relatively widely-spaced positions during loading of the fins into the cartridge, and closely-spaced positions during fitment of the fins onto the tube(s). The closely-spaced positions may correspond to the desired spacing between the fins upon the tube.

Desirably, the support means are biassed apart by resilient biassing means. Such an arrangement results in the support means automatically adopting their widely-spaced positions prior to loading of the fins into the cartridge. The support means can be forced into their closely-spaced positions (perhaps by the carrier means) during the finning process.

In embodiments in which the support means have apertures through which the tube(s) can pass, the support means are preferably formed in separable parts so that they can be separated from the fins following fitment of the fins onto the tubes. In any event, the cartridge (and the support means carried thereby) must be able to move laterally relative to the longitudinal axis of the tubes after fitment of the fins, since the presence of the fins will prevent longitudinal retraction of the cartridge. Preferably, the cartridge is separable from the finned tube(s) whilst the tube(s) remains clamped by the clamping means, e.g. so that the cartridge can be re-filled with fins for subsequent location onto the tube(s). Alternatively, the tube(s) must be removed from the clamping means before the cartridge can be separated from the finned tube, it being arranged that successive cartridges can be used if a large number of fins is to be fitted to the tube(s).

Desirably, in embodiments having movable support means, the support means carry spacing means. The purpose of the spacing means is to define the minimum separation between adjacent support means, and may be desired in applications utilising fins with collars. Thus, the spacing means can if desired ensure that the support means (and therefore the fitted fins) are spaced apart by a distance greater than the length of the collars, so that the support means can be removed from between the fitted fins without fouling the collars. Alternative arrangements are possible in which the collars project into the plane of the support means during fin fitment, but in those embodiments it is desired that the spacing means and support means together ensure that the collar of one fin does not become interlocked with the collar of an adjacent fin.

BRIEF DESCRIPTION OF THE DRAWINGS

The invention will now be described, by way of example, with reference to the accompanying schematic drawings, in which.

DESCRIPTION OF THE PREFERRED EMBODIMENTS

Figure 1:
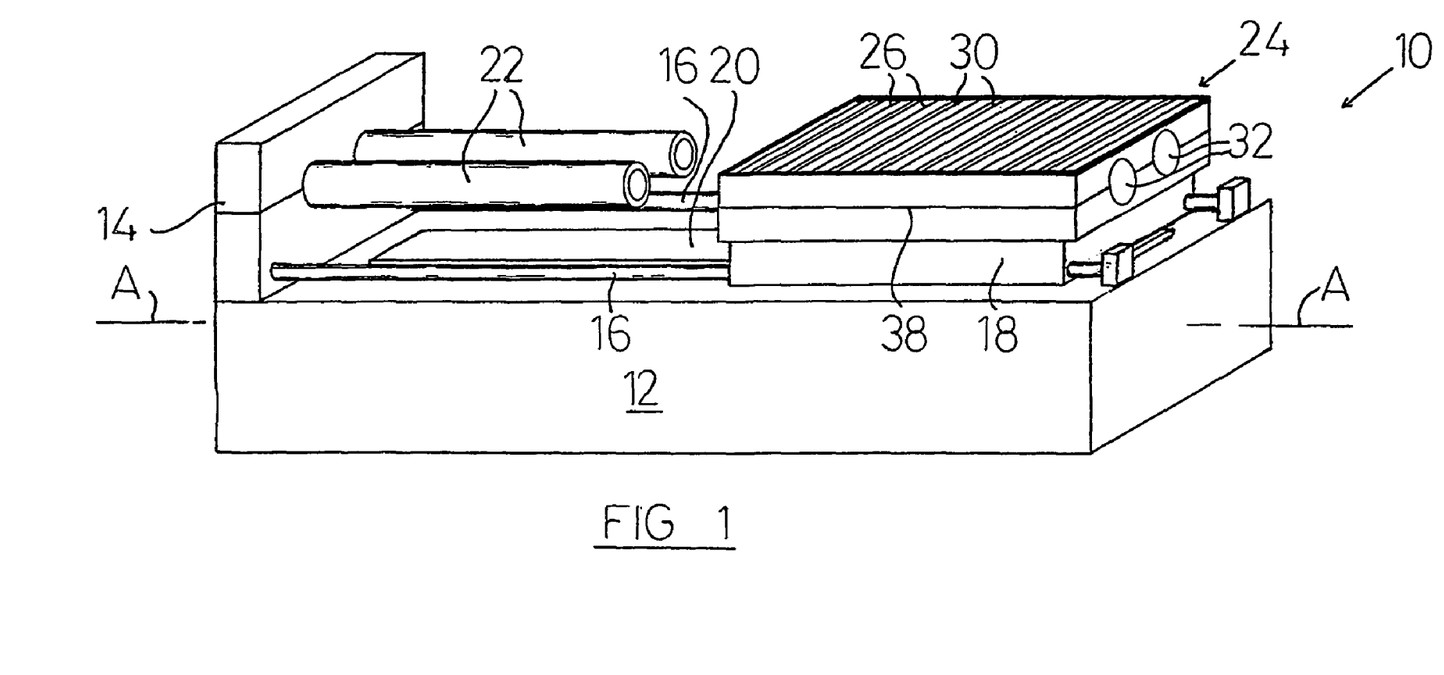
FIG. 1 shows a tube finning machine according to the invention, prior to fitment of several common-fins to two tubes.

In this description, directional terms such as "top", "bottom", "upper", "lower" etc. refer to the orientation of the machine and its components as drawn in FIG. 1, which is foreseen to be the normal orientation of use. However, the use of a machine at other orientations (e.g. with the tubes standing, or suspended, substantially vertically) is not excluded, and the relative directional terms can be translated to such orientation.

In this embodiment the machine 10 comprises a substantially rigid base 12, at one end of which is a fixedly mounted clamping means 14. The base has a pair of guide bars 16, upon which can slide carrier means 18. The drive means for moving the carrier means 18 in this embodiment is a linear motor of known design which includes a first winding 20 mounted upon the base 12 and arranged substantially parallel to the longitudinal axis A—A of the base 12, and a second winding (not seen) located within the carrier means 18; the second winding slides with the carrier means 18 closely adjacent the first winding 20. The electrical wires leading to the first and second windings are of known form, and are not shown.

In alternative embodiments other drive means could be employed, such as hydraulic, pneumatic, or screw drive, as might be desired in the particular application.

In this embodiment, the clamping means 14 is adapted to secure the ends of two tubes 22 so that the tubes are held substantially rigidly relative to the base 12. The clamping of the ends of the tubes can be by any suitable means (several of which are described in WO96/35093 for example).

Located upon the carrier means is a cartridge means 24, into which have been loaded several extended surface members or fins 26. In this embodiment there are nine fins 26, adjacent fins being separated by respective support means or wall members 30 (see also the wall members 130 of FIG. 2). The end walls of the cartridge means 24 have openings 32 therethrough, and the wall members 30 have similar openings, so that the tubes 22 can pass therethrough, preferably without contacting the periphery of the openings.

Figure 2:
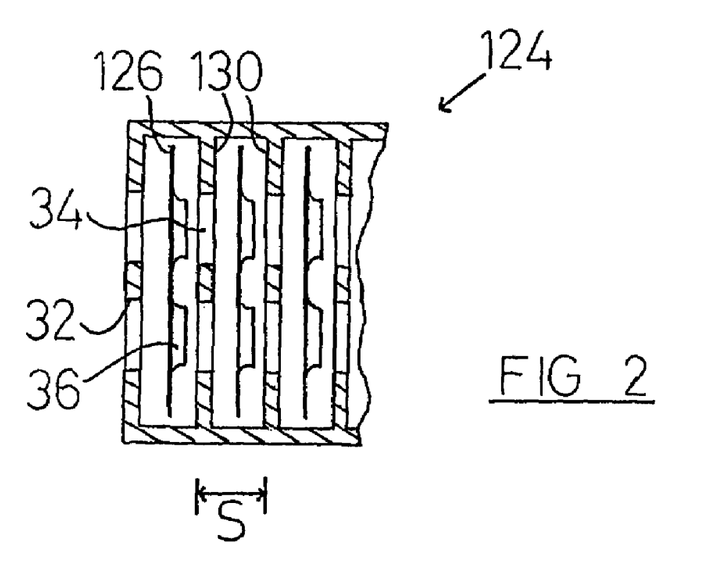
FIG. 2 shows a plan view, partly in section, of a cartridge means similar to that of the machine of FIG. 1.

As better seen in FIG. 2, the fins 26,126 in the embodiments described herein are common-fins, i.e. each fin 26,126 has two apertures 34, so that each can be connected to both of the tubes 22. It is expected that the present invention will almost invariably utilise common-fins, though it could clearly be used to apply separate, individual, fins to one or more tubes at the same time, depending upon the application for which the finned tube is intended.

The walls 30,130 are an integral part of the cartridge means 24,124, and in the embodiments of FIGS. 1 and 2 are immovable relative to the remainder of the cartridge means. The separation S between the adjacent wall members determines the separation between the fins in the assembled fin block. Thus, it will be understood that when the cartridge means is moved towards and around the tubes 22, the tubes 22 engage the collars 36 of the fins 126. It is desired that the collars 36 face in the direction of relative movement of the tubes, i.e. in the embodiment of FIG. 2 the collars are directed towards the right and the tubes will move relatively towards the right as the fins are inserted thereonto. Since the collars 36 are designed to be a frictional fit around the tubes 22, the tubes will act to push each fin towards the right until it engages its adjacent wall member 130. It will be noted that during fitment of the fins 126 they are substantially fully supported by the respective wall members 130, so that they are not likely to deform even if they are relatively thin, and/or the friction between the tube and collar is considerable.

It will be recognised that when the fins have been fitted onto the tubes, it is not possible to withdraw the cartridge means 24,124 longitudinally relative to the tubes, i.e. in the direction along the axis A—A. It is therefore necessary that the cartridge means 24,124 be removed laterally, and for this purpose the cartridge means 24,124 is split longitudinally substantially along its mid-line 38 (FIG. 1), permitting the top half to be removed upwardly and the bottom half to be removed downwardly.

Figure 3:
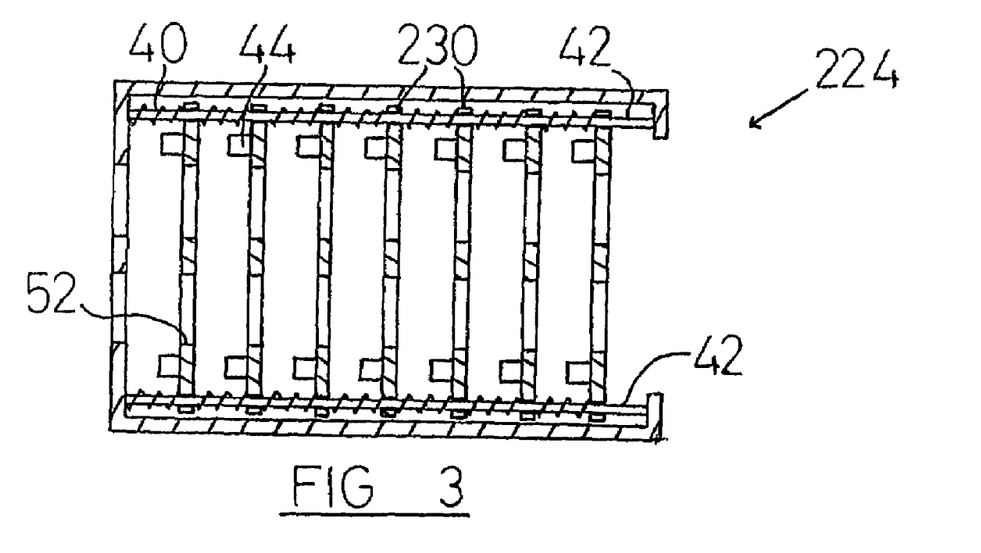
FIG. 3 shows a view similar to FIG. 2 of an alternative cartridge means prior to loading of the fins.
Figure 4:
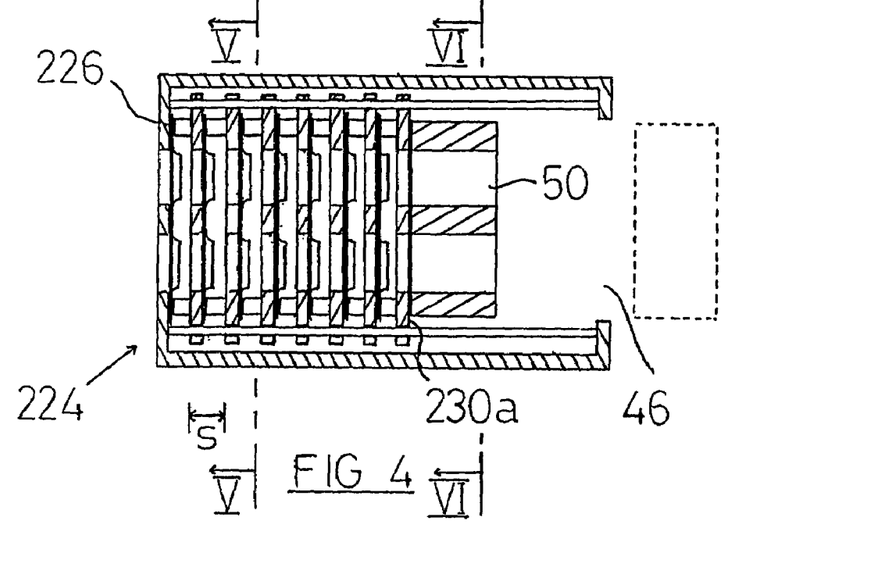
FIG. 4 shows the cartridge of FIG. 3 during tube finning.

In the embodiment of FIGS. 3 and 4, the wall members 230 are movably mounted within the cartridge means 224, and are biassed apart by respective compression springs 40. Mounted to the cartridge 224 are guide bars 42. The wall members 230 are slidably mounted upon the guide bars 42, and the compression springs 40 are located upon guide bars 42.

The wall members 230 each carry spacers 44, which serve to determine the minimum separation between the wall members 230, and thus to determine the separation s between the fitted fins (FIG. 4).

FIG. 3 shows the cartridge means 224 prior to loading of the fins. FIG. 4 shows the cartridge means 234 following loading of the fins 226 and during fitment onto the tubes 22. It will be noted that the cartridge includes an opening 46 which can accommodate an abutment 50 of the carrier means, i.e. following loading of the fins 226 the abutment 50 can be moved from a position shown in dotted outline to a position shown in solid outline, during which movement the springs 40 are compressed and the separation between adjacent fins 226 is reduced to the desired fin spacing s.

The point at which the compression of the springs 40 occurs will depend upon the rating of those springs and the resistance to movement of the fins 226 along the tubes 22. Thus, the drive means acts through the abutment 50 directly upon (and in this embodiment only upon) the wall member 230a, and that wall member 230a will drive the whole of the cartridge 224 until the frictional resistance to such movement (perhaps caused by the leading fin or fins 226 engaging the tubes 22) exceeds the rating of the springs 40, whereupon the springs 40 will successively be compressed. It is of course necessary to arrange that the combined spring rating is lower than the overall power of the machine, so that all of the springs are fully compressed when the lead fin has been pushed to its predetermined position upon the tubes, ensuring that all of the other fins are similarly positioned in their predetermined positions. The rating of the springs 40 will typically be small, since they are only required to force the wall members 230 apart to permit ease of loading of the fins.

It will be noted that in the embodiment of FIGS. 3 and 4 the spacers 44 project towards the left (as drawn) from their respective wall members. The effect of this is that the collars 36 of the fins are maintained away from the openings 52 of the wall members 230. However, it also results in less than complete support for the fins during fitment onto the tubes. It might be desired to increase the area of the spacers to increase the support for the fins. In alternative embodiments, however, the spacers can project towards the right (as drawn) from the respective wall members, so that during fitment the fins are substantially fully supported by the respective wall members. In yet further alternative embodiments, the spacers are omitted, and the fitted fins are separated by a spacing corresponding to the thickness of the wall members 230. Such spacing could be close to the dimension of the collar, but it is desirable in certain embodiments that the cartridge means separate the fins by a sufficient distance to prevent interlocking of adjacent collars, which interlocking significantly increases the frictional resistance to movement of the fins along the tubes.

Figure 5:
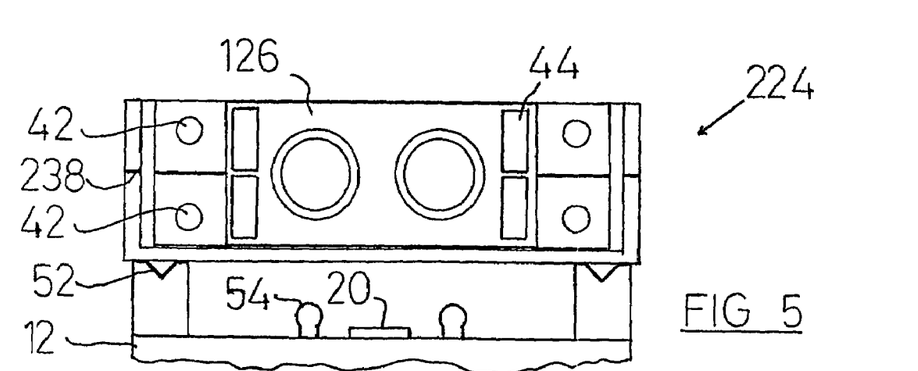
FIG. 5 shows a sectional view along the line V—V of FIG. 4.
Figure 6:
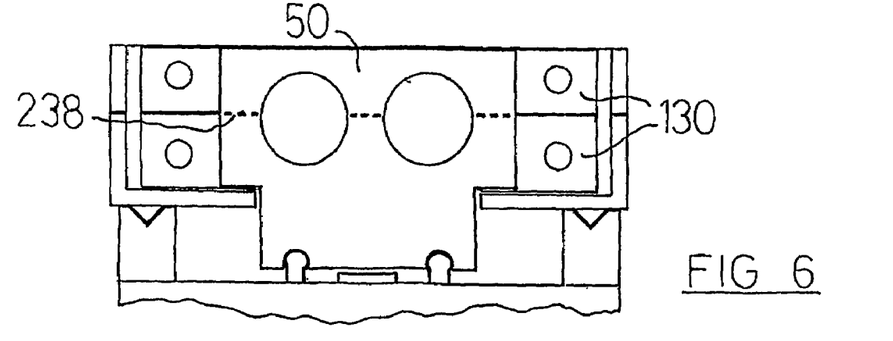
FIG. 6 shows a sectional view along the line VI—VI of FIG. 4.

As seen in FIGS. 5 and 6, the cartridge means 224 is mounted to slide along the base, specifically along guides 52 which lie parallel to the longitudinal axis A—A. The carrier means 18 is also mounted to slide along the base, specifically along guides 54. Clearly, the form of the guides 52,54 can be chosen as desired, and the form of the guides for the cartridge means 224 might be substantially identical to the form of the guides for the carrier means 18, for example. In the embodiment shown the cartridge means 224 may simply be placed into the guides 52, but in alternative embodiments the cartridge means might be more securely fastened to the base, e.g. it might be securable to guide members permanently (but slidably) mounted to the base.

The embodiment of FIGS. 3–6 has a split 238 along its mid-line, so that the top "half" of the cartridge means can be moved upwardly to separate it from the finned tube, whilst the bottom "half" can be moved downwardly. The two "halves" can be secured together by any suitable releasable fastening means. Since the split 238 also necessarily crosses the wall members 230, four guide bars 42 are provided, one to either side of the wall members 230 above and below the split 238.

Figure 7:
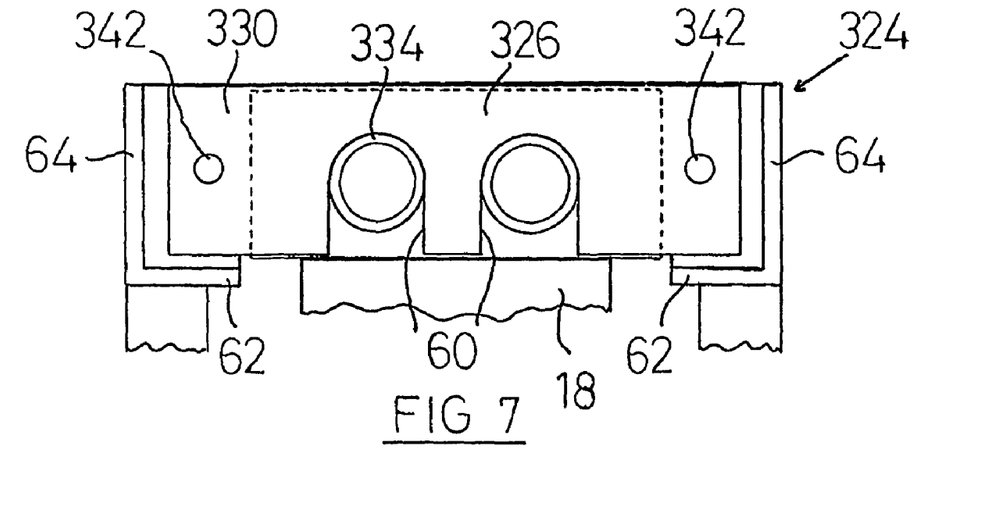
FIG. 7 shows a view of a wall member of another alternative cartridge means.

In the alternative embodiment of FIG. 7, the cartridge means 324 is not split but instead is designed to be removable as a single component upwardly following fitment of the fins upon the tubes. Thus, the end walls of the cartridge means (not shown) and the wall members 330, all incorporate open-sided apertures 60, the apertures allowing passage of the tubes 22 therethrough, but also subsequently allowing separation of the cartridge means from the finned tube. It will be noted that there must be provision for preventing the fins from falling out of the cartridge following loading thereinto, and in this embodiment this is provided for in that the cartridge lies directly upon the carrier means 18, and the fins are loaded into the cartridge after the cartridge has been placed upon the carrier means 18. In alternative embodiments in which it is desired that the cartridge be loaded away from the machine (so as to reduce the "down-time" of the machine) other suitable means for preventing the fins from falling out of the cartridge can be provided, which .means can be removed once the cartridge is mounted upon the machine and the fins are supported by the carrier means (or are supported by the tubes during finning). In another embodiment, the ledges 62 which are secured to the side walls 64 of the cartridge means 324 can include movable projections which can support the fins as these are loaded thereinto and during fitment onto the tubes 22, but which can be moved to allow the cartridge means 324 to be separated from the finned tubes.

In the embodiment of FIG. 7 the wall members 330 are movable, and the cartridge means has two guide bars 342 upon which the wall members are mounted in similar fashion to the embodiment of FIGS. 3–6. In an alternative embodiment the wall members can be secured in fixed positions relative to the side walls.

Figure 8:
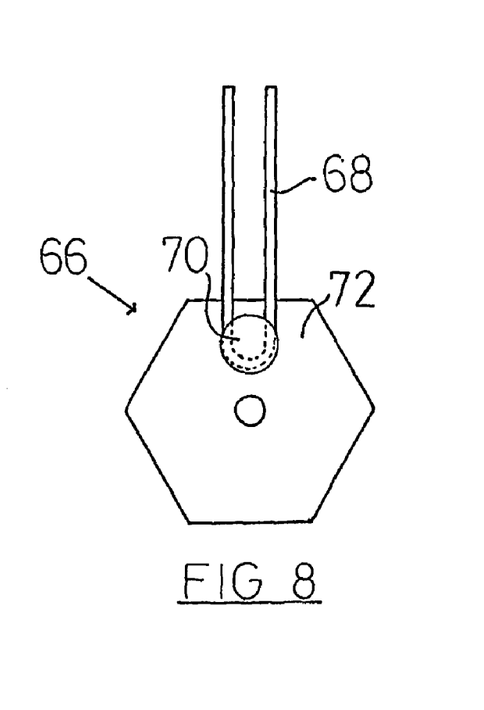
FIG. 8 shows a carousel arrangement for the clamping means.

FIG. 8 shows a carousel clamping means 66 for the ends of the tubes. In this embodiment, the tube 68 is bent into a "U" shape, which is not uncommon in heat exchanger applications. The base of the "U" is clamped between the jaw 70 and the housing 72 (which clamping might be effected by hydraulic or pneumatic pressure, for example, or by a nut and bolt, as desired). Only one U-shaped tube 68 is shown, though in practice up to six tubes 68 could be secured to the carousel, so that in use one U-shaped tube could be facing the carrier means in the finning position, whilst other tubes could be in position to be removed from the carousel following finning, and further tubes could be in position, or prepared to be located in position, ready for finning.

The carousel arrangement can increase the utility of the machine by reducing the down-time associated with clamping the tube(s) into position prior to finning, and subsequently removing the finned tubes.

Figure 9:
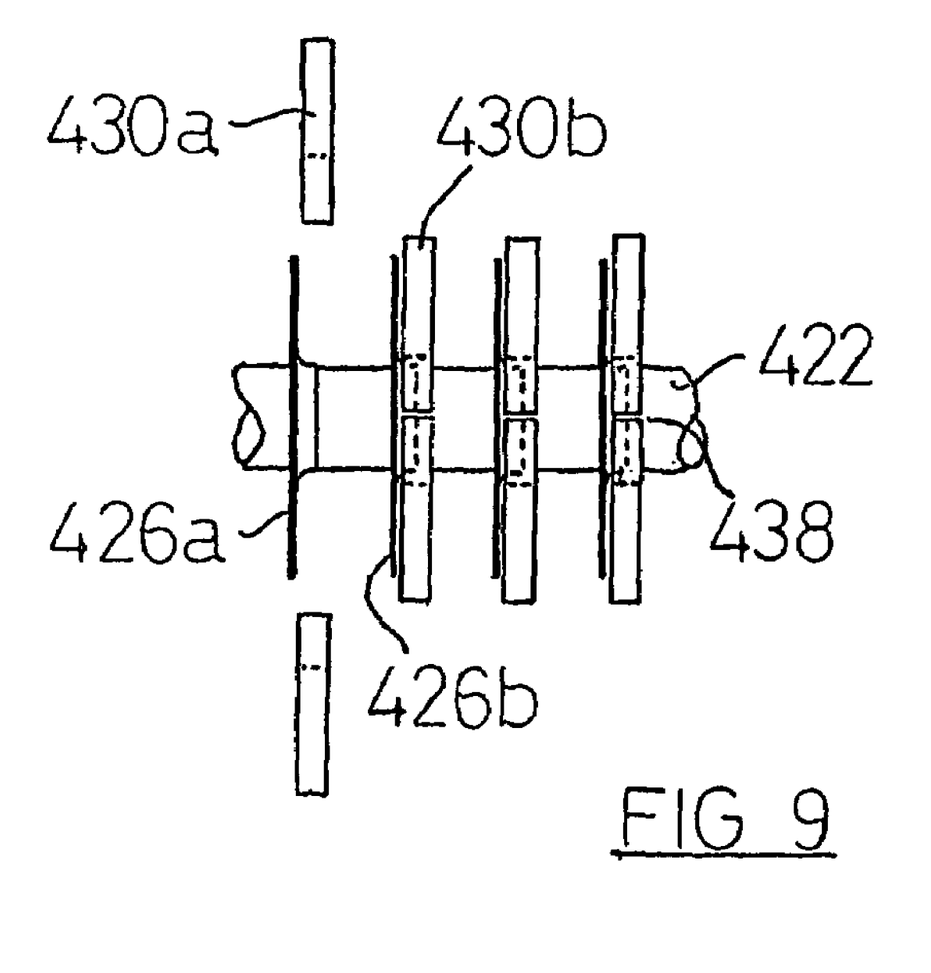
FIG. 9 shows a side view of part of yet another alternative cartridge means.

In the embodiment of FIG. 9, the wall members 430 are placed at fixed longitudinal positions in the cartridge means (i.e. they are not able to move together and apart as in the embodiments of FIGS. 3–7. The wall members are each split at their mid-line 438, so that the top part of the wall member can be moved upwards to separate it from a fitted fin, whilst the bottom part can be moved downwards to separate it from the fitted fin. In this embodiment, however, the parts of each wall member 430 can be moved independently of the other wall members and the remainder of the cartridge, and in FIG. 9 the parts of the leading wall member 430a have been moved to separate them from the leading fin 426a.

Following the separation of the wall member 430a, the cartridge can be moved farther to the left as drawn, the wall member 430b driving the next fin 426b to the left, and into engagement with the collar 436 of the fin 426a (if desired the engagement can be such as to interlock the two fins 426a,b together so obtaining the benefits of such interlocking).

When the fin 426b has been moved into engagement with the fin 426a, the wall member 430b can be separated, exposing the next fin which can be subsequently moved into engagement with the collar of fin 426b, and so on.

It can be arranged that the cartridge means of this embodiment does not have a leading end wall to the left of the leading fin 426a, so that the leading fin can be moved into engagement with the collar of an existing fin, i.e. a fin which has previously been positioned upon the tube 422, perhaps by the movement of a previous cartridge means.

In FIG. 9, the fin 426b is shown at a slight distance away from the wall member 430b, but this is for reasons of clarity only. Thus, in practice the wall member 430b will drive the fin 426b towards the left as the cartridge is itself driven to the left by the carrier means, and so each fin member will engage its respective wall member.

It will be appreciated that the fin members 426 could be spaced apart within the cartridge means of FIG. 9 by any desired distance, and the wall members 430 could be as thick as required to ensure that neither they nor the fins will become deformed during fitment onto the tube(s).

The separation of the parts of the wall members can be effected by any suitable means, such as for example pneumatic actuators. The parts of the wall members 430 can be arranged to slide within linear guides located in the side walls of the cartridge means. Following the separation of all of the wall members (so that all of the fins which were loaded into the cartridge means have been fitted in their predetermined positions upon the tube(s)), the cartridge means can be withdrawn longitudinally relative to the tube(s) 422, the parts of the wall members 430 being brought together once again when the cartridge means has cleared the end of the tube(s).

In the embodiments described the tube(s) are (substantially) fixed relative to the base of the machine and the fins are movable relative thereto; this arrangement has considerable advantages as outlined above. Nevertheless, arrangements in which the fins are substantially fixed relative to the base and the tubes are movable relative to the base, and in which both the fins and the tubes are movable relative to the base, and not necessarily excluded from the scope of the invention.

The invention claimed is:

1. A tube finning machine for mounting extended surface members upon one or more tubes, the machine having a base, a carrier movable relative to the base, a driver for moving the carrier in a longitudinal direction, and a cartridge for locating a plurality of extended surface members, wherein the cartridge has respective support members for each extended surface member, and wherein at least some of the support members are movable relative to the cartridge in the longitudinal direction.

2. A tube finning machine for mounting extended surface members upon one or more tubes, the machine having a base, a carrier movable relative to the base, a driver for moving the carrier in a longitudinal direction, and a cartridge for locating a plurality of extended surface members, wherein the cartridge has respective support members for the extended surface members, and wherein the support members are individually movable laterally relative to the longitudinal direction.

3. A tube finning machine according to claim 1 in which each support member spans a substantial part of the extended surface member.

4. A tube finning machine according to claim 3 in which the periphery of the extended surface members lie within the periphery of the support members.

5. A tube finning machine according to claim 1 in which the support members are resiliently biassed apart.

6. A tube finning machine according to claim 1 in which each support member comprises separable parts.

7. A rube finning machine for mounting extended surface members upon one or more tubes, the machine having a base, a carrier movable relative to the base, a driver for moving the carrier, and a cartridge for locating a plurality of extended surface members, wherein a clamp is mounted to the base for clamping a portion of at least one tube in a substantially fixed position relative to the base, and wherein the cartridge is connected to the carrier so that said plurality of extended surface members can be moved to an axially predetermined position relative to the tube(s).

8. A tube finning machine according to claim 7 in which the cartridge has a respective support members for each extended surface member.

9. A tube finning machine according to claim 8 in which each support member spans a substantial part of the extended surface member.

10. A tube finning machine according to claim 9 in which the periphery of the extended surface members lie within the periphery of the support members.

11. A tube finning machine according to claim 7 in which at least some of the support members are movable relative to the cartridge.

12. A tube finning machine according to claim 11 in which the support members are resiliently biassed apart.

13. A tube finning machine according to claim 8 in which each support member comprises separable parts.

14. A tube finning machine for mounting extended surface members upon one or more tubes, the machine having a base, a carrier movable relative to the base, a driver for moving the carrier, and a cartridge for locating a plurality of extended surface members, wherein the cartridge has a respective support member for each extended surface member, wherein each support member spans a substantial part of the extended surface member, wherein at least some of the support members are movable relative to the cartridge tube finning machine and wherein the support members are resiliently biassed apart.

15. A tube finning machine according to claim 14 in which each support member comprises separable parts.

16. A method of mounting extended surface members to one or more tubes using a tube finning machine for mounting extended surface members upon one or more tubes, the machine having a base, a carrier movable relative to the base, a driver for moving the carrier in a longitudinal direction, and a cartridge for locating a plurality of extended surface members, wherein the cartridge has respective support members for the extended surface members, and wherein the support members are individually movable laterally relative to the longitudinal direction, the method comprising the following steps: {i} mounting one or more tubes onto the machine, {ii} mounting the cartridge loaded with a plurality of extended surface members onto the machine, {iii} actuating the driver to cause the carrier to effect relative movement of the cartridge and tube(s) until the leading extended surface member within the cartridge reaches a first predetermined position relative to the tube(s), {iv} moving the support member of the leading extended surface member laterally relative to the cartridge, and {v} actuating the driver again to cause the carrier to effect further relative movement of the cartridge and tube(s) until the next extended surface member within the cartridge reaches a second predetermined position relative to the tube(s).

* * * * *